(No Model.)
D. HERRINGTON.
WAGON BRAKE.
No. 440,032. Patented Nov. 4, 1890.
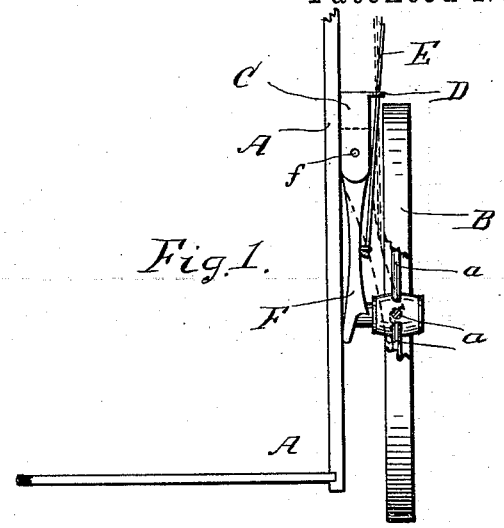
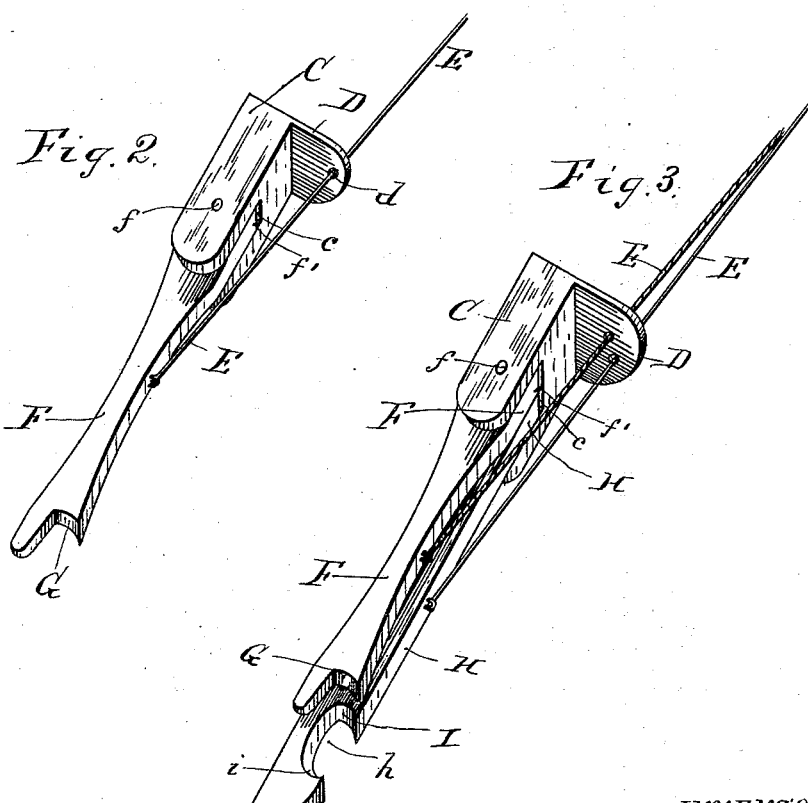
WITNESSES
J. M. Coomb
G. M. Copenhaver
INVENTOR
Deroy Herrington
C. T. Belt
Attorney

UNITED STATES PATENT OFFICE.

DEROY HERRINGTON, OF EBENTON, PENNSYLVANIA.

WAGON-BRAKE.

SPECIFICATION forming part of Letters Patent No. 440,032, dated November 4, 1890.

Application filed July 11, 1890. Serial No. 358,370. (No model.)

*To all whom it may concern:*

Be it known that I, DEROY HERRINGTON, a citizen of the United States, residing at Ebenton, in the county of Tioga and State of Pennsylvania, have invented certain new and useful Improvements in Wagon-Brakes, of which the following is a specification.

This invention relates to carriages and wagons, and particularly to wagon-brakes; and it consists in the novel arrangement and construction of parts, as will be hereinafter fully described, and set forth in the claim.

The object of the invention is to provide a device to take the place of the wagon-brakes universally used, and which require many parts to effect their certain operation, and also frequent repairs to such parts.

A further object of the invention is to provide a lock or brake for carriages and wagons, and particulary for heavy draft-wagons, which can be readily attached to any wagon-body and controlled by the wagon-driver in front or on top of a loaded wagon.

A still further object of the invention is to provide a device which will securely lock the wheels of a carriage or wagon, whether going up or down grade.

In the accompanying drawings, forming part of this specification, Figure 1 is a top view of part of a side of a wagon-body and one of the rear wheels with my improved device attached, showing in dotted lines its position when engaging said wheel. Fig. 2 is a perspective view of my brake or lock, and Fig. 3 is a modification thereof.

Like letters of reference denote like parts throughout the several figures of the drawings.

A represents a side of a wagon-body, and B the wagon-wheel having the usual spokes $a$. The locking device or brake is constructed with a head C, having a slot $c$, and right-angle guide projection D, having an aperture $d$, through which a cord E or its equivalent extends, being secured at one end to an arm F, while the other end is left free to be grasped or otherwise operated by the wagon-driver. The arm F is pivoted in the slot $c$ by a pivot-bolt $f$, and the said arm has a square end $f'$, which strikes against the bottom of the slot and prevents the strain of the arm when engaged by the wheel from coming on the pivot-bolt. On the opposite end of the arm F is formed a shoulder G, preferably curved, so as to conform to the rounds or spokes $a$.

As shown by the modification in Fig. 3, an additional arm H is provided by making the slot $c$ in the head C large enough to accommodate both arms H and F, pivoted on the same pivot-bolt $f$. The pivoted end of the arm H is of the same construction of the pivoted end of the arm F; but the opposite end of the said arm H is made rounding, and has an oblong notch or cut-out $h$. One corner I of such notch forms the bearing for the spokes $a$ when the wheels are turning forward, while the opposite corner $i$ of the said notch or cut-out forms the bearing for the spokes $a$ when the wheels are turned backward—that is, this arm H will lock the wheel on any grade with the wagon moving in either direction.

The bearing-surfaces of the shoulder of the arm F and the cut-out of the arm H are lined with elastic material to prevent the wear of the spokes.

Having thus described my invention, what I claim as new, and desire to secure by Letters Patent, is—

A brake for carriages and wagons, consisting of the slotted head having a guide projection extending at right angles therefrom, the arm F, pivoted in the said slotted head and having the square end $f'$, for the purpose set forth, its opposite end having the shoulder G, and the arm H, also pivoted in the slotted head, both of the said arms being arranged to be operated horizontally, so as to prevent the wagon-wheel from turning either backward or forward.

In witness whereof I hereunto set my hand in the presence of two witnesses.

DEROY HERRINGTON.

Witnesses:
ELLA J. MERRICK,
W. W. MERRICK.